United States Patent
Miyata et al.

(10) Patent No.: US 8,965,660 B2
(45) Date of Patent: Feb. 24, 2015

(54) CONTROL APPARATUS FOR ENGINE

(75) Inventors: Toshiyuki Miyata, Okazaki (JP); Katsunori Ueda, Okazaki (JP); Koji Shibata, Okazaki (JP); Hiroaki Ueno, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 692 days.

(21) Appl. No.: 13/302,568

(22) Filed: Nov. 22, 2011

(65) Prior Publication Data

US 2012/0209493 A1 Aug. 16, 2012

(30) Foreign Application Priority Data

Feb. 16, 2011 (JP) .................................. 2011-030718

(51) Int. Cl.
| | | |
|---|---|---|
| F02D 11/10 | (2006.01) | |
| F02D 13/02 | (2006.01) | |
| F02D 41/00 | (2006.01) | |

(52) U.S. Cl.
CPC .......... F02D 13/02 (2013.01); F02D 2200/602 (2013.01); F02D 2250/18 (2013.01); F02D 11/105 (2013.01); F02D 41/0002 (2013.01); F02D 2200/0408 (2013.01); Y02T 10/42 (2013.01); Y02T 10/18 (2013.01)
USPC .............................. 701/102; 701/110; 701/85

(58) Field of Classification Search
USPC ......................................................... 701/99
See application file for complete search history.

(56) References Cited

U.S. PATENT DOCUMENTS

| | | | |
|---|---|---|---|
| 7,571,711 B2 | 8/2009 | Sato et al. | |
| 7,673,613 B2 | 3/2010 | Yamashita | |
| 2007/0240680 A1 | 10/2007 | Muto et al. | |
| 2008/0066718 A1* | 3/2008 | Sato et al. | ..................... 123/350 |
| 2008/0120009 A1 | 5/2008 | Livshiz et al. | |
| 2009/0292452 A1 | 11/2009 | Nishimura et al. | |

FOREIGN PATENT DOCUMENTS

| | | | |
|---|---|---|---|
| JP | 2006-83804 A | | 3/2006 |
| JP | 2006083804 A | * | 3/2006 |
| JP | 2006-132498 A | | 5/2006 |
| JP | 2009-24677 A | | 2/2009 |
| JP | 2010-133426 A | | 6/2010 |
| JP | 2010133426 A | * | 6/2010 |
| WO | WO 2006/016423 A1 | | 2/2006 |

* cited by examiner

Primary Examiner — Shelley Chen
(74) Attorney, Agent, or Firm — Birch, Stewart, Kolasch & Birch, LLP

(57) ABSTRACT

A first calculation device is provided that calculates a ratio of a target torque equivalent value of an engine to a maximum torque equivalent value of the engine, as a pressure ratio equivalent value. A second calculation device is also provided that calculates a flow velocity of air to flowing through a throttle valve in the engine, based on the pressure ratio equivalent value calculated by the first calculation device. A third calculation device is further provided that calculates a target throttle valve opening, based on the flow velocity calculated by the second calculation device. With this configuration, the target opening of a throttle valve corresponding to the requested engine torque, without using the pressures before and after the throttle valve section.

12 Claims, 6 Drawing Sheets

CONTROL APPARATUS FOR ENGINE

CROSS-REFERENCE TO THE RELATED APPLICATION

This application incorporates by references the subject matter of Application No. 2011-030718 filed in Japan on Feb. 16, 2011 on which a priority claim is based under 35 U.S.C. §119(a).

FIELD

The present invention relates to a control apparatus for an engine relevant to control of a throttle valve opening.

BACKGROUND

One well-known technique for controlling an engine mounted in a vehicle is a torque-based (torque-demand) control which controls the amount of intake air, the amount of injecting fuel, the ignition timing, and the like, based on the torque requested to the engine. A torque-based control calculates a target engine torque, based on the accelerator opening, the engine speed, and the like, for example, and controls the engine such that the target torque is produced. In addition, in a vehicle having external control systems installed therein, such as an automatic transmission, an automatic cruise controller, and a vehicle stabilizer, respective output requests from such external control systems to the engine are centralized and converted into torques, which are then combined into a single value in an engine electronic control apparatus (engine ECU). Thereby the torque behavior of the engine is controlled in a unified comprehensive manner in the engine electronic control apparatus.

In the meantime, the magnitude of the torque produced in the engine depends on the amount of intake air introduced to the cylinder, under the constant combustion conditions, such as the same amount of injecting fuel and the same ignition timing. The amount of intake air varies dependent on the opening of a throttle valve provided on an intake path to the engine. Accordingly, the magnitude of the engine torque can be controlled by adjusting the throttle valve opening.

For example, Patent Literature 1 (Japanese Laid-open Patent Application No. 2009-024677) describes a technique wherein a target torque is converted into a target air amount filled in a cylinder, and a target throttle opening is calculated such that an estimated air amount filled in the cylinder follows the target air amount filled in the cylinder. In this technique, the estimated air amount filled in the cylinder is calculated with a physical model obtained in consideration of the change in the amount of air flowing through the throttle valve and the delay in the intake system, and the throttle opening is controlled such that the estimated amount approaches the target amount.

The flow rate of the air flowing through the throttle valve is represented as a product of the opening area of the throttle valve and the flow velocity of the air. Accordingly, once the flow velocity of the air flowing through the throttle valve is determined, the throttle opening for producing a requested engine torque can be precisely obtained.

For example, Patent Literature 2 (Japanese Laid-open Patent Application No. 2006-132498) describes a technique to calculate a value proportional to the flow velocity of the air (flow rate coefficient), using a ratio (pressure ratio) of the downstream pressure to the upstream pressure of the throttle valve section. In this technique, the pressure ratio is calculated based on signals output from respective pressure sensors provided upstream and downstream to the throttle valve, and an estimate of the amount of air to be introduced to the cylinder is calculated by use of this ratio.

However, in order to calculate the pressure ratio, respective pressure sensors are required for both the upstream and downstream sides of the throttle valve section, and the pressure ratio cannot be calculated if either of the pressure sensors fails. More specifically, the amount of air to be introduced to the cylinder upon adjusting the throttle valve opening is calculated under an assumption that the two pressure sensors are functioning well and are accurate. Therefore, if either of the pressure sensors fails or their detection precision deteriorates, the precision of the estimated air amount may be deteriorated and the controllability of the engine torque based on this amount of intake air may be compromised and degraded.

As a fail safe in case of a failure of a pressure sensor, it is considered to provide a technique for estimating the amount of air to be introduced to the cylinder without using a pressure ratio. For example, the relations between throttle valve openings and the amounts of air to be introduced to the cylinder with these openings are defined in a map or table, which is stored in the engine ECU. However, a map or table corresponding to a wide variety of driving conditions should be defined beforehand, which consumes larger ROM space in the engine ECU and boosts the development cost.

SUMMARY

Technical Problems

The present disclosure is conceived of in light of the above issues, and an object thereof is to calculate a target throttle valve opening corresponding to a requested engine torque, without using pressures before and after a throttle valve section.

Note that it is another object of the present disclosure to provide advantages and effects that can be obtained by respective configurations described in the embodiment described below, but cannot be obtained with conventional techniques.

Solution to Problems (1) A control apparatus for an engine disclosed therein includes a first calculation device that calculates a ratio of a target torque equivalent value of an engine to a maximum torque equivalent value of the engine, as a pressure ratio equivalent value.

It also includes a second calculation device that calculates a flow velocity of air flowing through a throttle valve in the engine, based on the pressure ratio equivalent value calculated by the first calculation device.

Furthermore, it includes a third calculation device that calculates a target throttle valve opening, based on the flow velocity calculated by the second calculation device.

Here, the "pressure ratio equivalent value" is a value equivalent to the ratio of the downstream pressure to the upstream pressure of the throttle valve section (pressure ratio). In addition, the "maximum torque equivalent value of the engine" is a value corresponding to the torque that can be generated under the operational status of the engine at that time, and is set in accordance with the engine speed, for example.

(2) Preferably, the first calculation device calculates the maximum torque equivalent value in accordance with valve lift degrees or valve timings of intake or exhaust valve.

More specifically, preferably, the maximum engine torque that can be generated under the control status of the intake or exhaust valve at the time of the calculation is calculated as the maximum torque equivalent value.

(3) In addition, preferably, the first calculation device calculates a torque produced in the engine with the amount of air introduced to the engine, as the maximum torque equivalent value, and calculates a target torque set based on an output request to the engine, as the target torque equivalent value.

Here, preferably, "the amount of air introduced to the engine" is the maximum amount of air introduced to the engine in accordance with the engine speed. More specifically, preferably, it is the amount of air introduced to the engine, assuming that the throttle opening is full open at the engine speed at that time. In other words, preferably, the maximum torque equivalent value is the torque produced in the engine, assuming that the throttle opening is full open at the engine speed at that time.

(4) In addition, preferably, the first calculation device calculates a torque produced in the engine at an ignition timing of the minimum spark advance for best torque (i.e., MBT), as the maximum torque equivalent value.

The ignition timing may be shifted to the retard side from MBT in the light of preventing knocking. That is, the first calculation device may calculate the torque which is produced at a predetermined ignition timing slightly shifted to the retard side from MBT, as the maximum torque equivalent value in this case.

(5) In addition, preferably, the first calculation device calculates a maximum torque produced in the engine during combustion at a preset air-fuel ratio, as the maximum torque equivalent value. Examples of the preset air-fuel ratio include the stoichiometric air-fuel ratio (air-fuel ratio around 14.7) and the best air-fuel ratio for power (air-fuel ratio of 12.0-13.0).

(6) In addition, preferably, the first calculation device calculates the pressure ratio equivalent value, using a maximum charging efficiency of the engine as the maximum torque equivalent value, and using a target charging efficiency calculated based on the air amount as the target torque equivalent value.

Advantageous Effects

The control apparatus for an engine according to the present disclosure calculates the ratio of the target torque equivalent value to the maximum torque equivalent value of the engine as a "pressure ratio equivalent value". Then the control unit calculates the flow velocity of intake air by use of the "pressure ratio equivalent value". That is, the target throttle valve opening can be determined without using measured pressures before and after the throttle valve section.

In addition, since the pressure ratio equivalent value has a correlation with the ratio of the downstream pressure to the upstream pressure of the throttle valve section, the target throttle valve opening can be precisely set.

Furthermore, calculation of the target opening can be simplified by use of the correlation between the pressure ratio equivalent value A and the pressure ratio C. No complex map or table corresponding to a wide variety of operational status of the engine is required. Such a plain construction helps to save the ROM space for storing data used for calculation.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

A control apparatus will be described with reference to drawings. Note that an embodiment below is described by way of example only, and various modifications and applications of techniques that are not shown explicitly in the embodiment below are not intended to be excluded.

1. DEVICE CONFIGURATION

Figure 1:
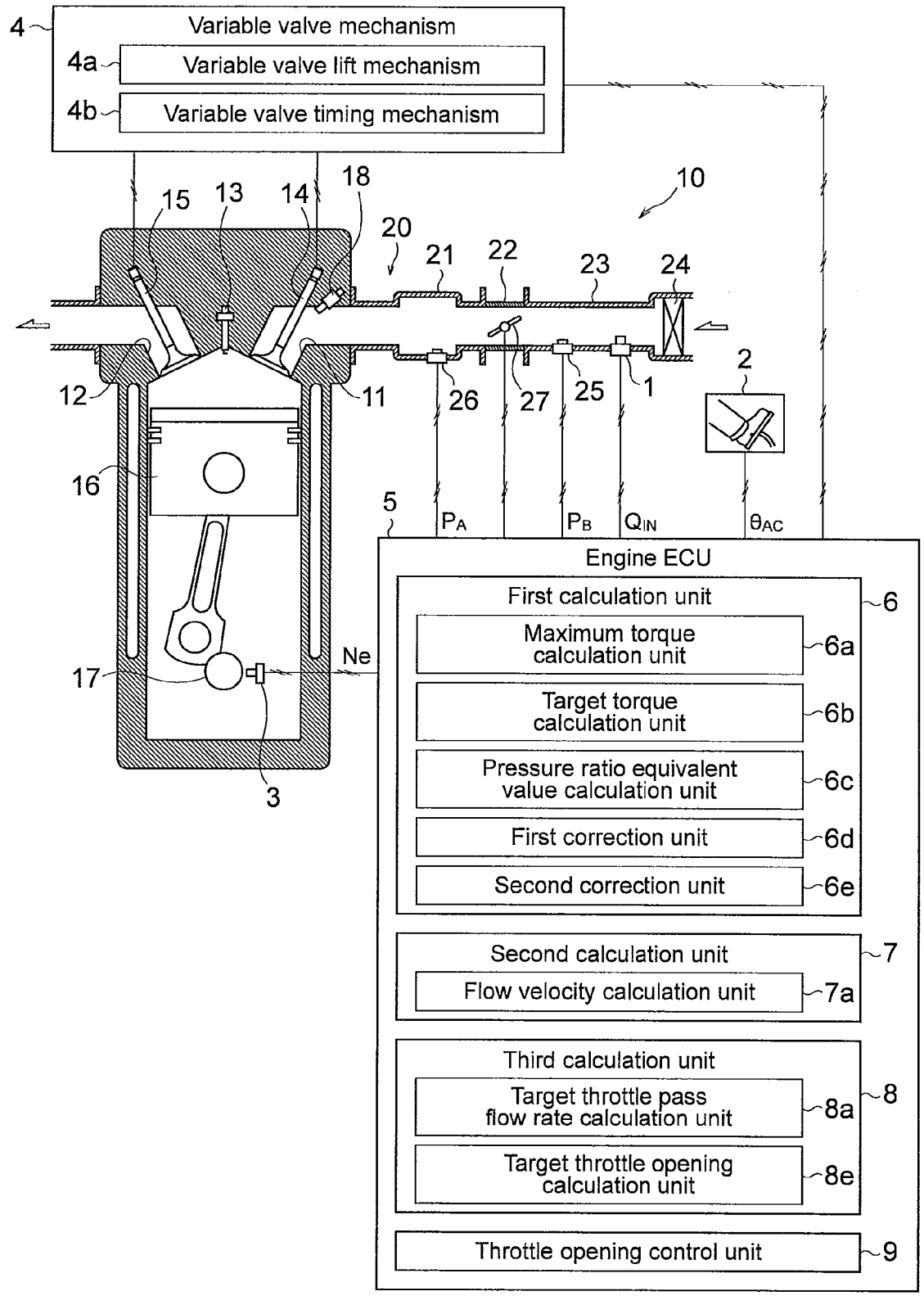
FIG. 1 is a diagram illustrating the block configuration of a control apparatus for an engine in accordance with an embodiment and an engine to which this control apparatus is applied.

A control apparatus for an engine of the present embodiment is applied to an engine 10 mounted in a vehicle shown in FIG. 1. One of cylinders disposed in the multi-cylinder engine 10 is shown in this figure. On the top of the cylinder, an ignition plug 13 is provided such that the tip of the ignition plug 13 protrudes toward a combustion chamber. On the top face of the combustion chamber at the cylinder head side, an intake port 11 and an exhaust port 12 are provided.

On this top face of the combustion chamber, an intake valve 14 and an exhaust valve 15 are provided. The intake valve 14 is for opening or closing the inlet from the intake port 11, and an exhaust valve 15 is for opening or closing the outlet to the exhaust port 12. An injector 18 for jetting fuel is provided in the intake port 11. The intake port 11 and the combustion chamber are connected or disconnected according as the inlet is opened or closed by the intake valve 14. In the similar way, the exhaust port 12 and the combustion chamber are connected or disconnected according as the outlet is opened or closed by the exhaust valve 15. Each of the top ends of the intake and exhaust valves 14 and 15 is connected to an end of a locker arm in a variable valve mechanism 4. The locker arm is a swing member pivoted (or fixed) on a locker shaft, and the intake and exhaust valves 14 and 15 are driven in a reciprocating manner in the vertical direction when each locker arm swings. A cam pivoted (or fixed) on a cam shaft is provided on the other end of the locker arm. In this manner, the swing pattern of the locker arm follows the outline of the cam (cam profile).

The variable valve mechanism 4 is a mechanism to vary the maximum valve lift (valve lift degree, valve opening duration) and the valve timings of the intake and exhaust valves 14 and 15. The variable valve mechanism 4 varies each of the lifts and timings independently or cooperatively. The variable valve mechanism 4 includes a variable valve lift mechanism 4a and a variable valve timing mechanism 4b, as mechanisms to vary the swing degree and the swing timing of the locker arm.

The variable valve lift mechanism 4a is a mechanism for continuously and smoothly varying the maximum valve lift of each of the intake and exhaust valves 14 and 15. The variable valve lift mechanism 4a functions to vary the magnitude of the swing sent from the cam secured to the cam shaft to the locker arm. The particular structure for varying the magnitude of the swing of the locker arm may have any suitable structure.

The variable valve timing mechanism 4b is a mechanism for varying the timings (valve timings) for opening or closing each of the intake and exhaust valves 14 and 15. The variable valve timing mechanism 4b functions to change the rotational phase of the cam or the cam shaft which causes swing of the locker arm. By changing the rotational phase of the cam or the cam shaft, it becomes possible to continuously and smoothly shift the swing timing of locker arm with respect to the rotational phase of a crank shaft 17.

An intake manifold 20 is located upstream of the intake port 11 in the intake air flow. A surge tank 21 is provided in the intake manifold 20 for temporarily storing the air flowing toward the intake port 11. The downstream end of the intake manifold 20 is formed so as to branch into multiple intake ports 11 for the cylinders, and the surge tank 21 is provided at the branching point. The surge tank 21 functions to mitigate pulsation occurring at each cylinder and to prevent mutual interference in intake process.

A throttle body 22 is connected to the upstream end of the intake manifold 20. An electronically controlled throttle valve 27 is provided inside the throttle body 22, and the amount of air flowing toward the intake manifold 20 is adjusted in accordance with the opening of the throttle valve 27 (throttle opening $\theta_{TH}$). The throttle opening $\theta_{TH}$ is electronically controlled by an engine ECU 5, which will be described later.

An intake passage 23 is connected to a further upstream side of the throttle body 22. An air flow sensor 1 that detects the flow rate $Q_{IN}$ of the air is provided in the intake passage 23. The information about the flow rate $Q_{IN}$ detected at the air flow sensor 1 is sent to the engine ECU 5.

An air filter 24 is disposed on a further upstream side of the intake passage 23. With this configuration, fresh air filtrated by the air filter 24 is provided to the cylinder of the engine 10 through the intake passage 23 and the intake manifold 20.

An atmospheric pressure sensor 25 and an intake manifold pressure sensor 26 are provided upstream and downstream to the throttle valve 27, for detecting the pressures at their respective locations. The atmospheric pressure sensor 25 detects an upstream pressure $P_B$ of the throttle valve 27 (pressure corresponding to the atmospheric pressure), whereas the intake manifold pressure sensor 26 detects a downstream pressure $P_A$ of the throttle valve 27 (pressure corresponding to the pressure inside the surge tank). The information about the upstream pressure $P_B$ and the downstream pressures $P_A$ of the throttle valve section detected by each of the pressure sensors 25 and 26 is sent to the engine ECU 5.

A piston 16 slides inside the cylinder in a reciprocating manner, and is connected to the crank shaft 17 via a connecting rod. A crank angle sensor 3 for detecting the rotation angle $\theta_{CR}$ of the crank shaft 17 is provided with the crank shaft 17. A variation of the rotation angle $\theta_{CR}$ per unit time is proportional to the engine speed Ne. Accordingly, the crank angle sensor 3 is regarded as having a function to detect the engine speed Ne of the engine 10. The information about the engine speed Ne detected (or calculated) by the crank angle sensor 3 is sent to the engine ECU 5. Alternatively, the engine ECU 5 may calculate the engine speed Ne, based on the rotation angle $\theta_{CR}$ detected at the crank angle sensor 3.

At somewhere (arbitrary location) in the vehicle having the engine 10 shown in FIG. 1 mounted therein, an accelerator pedal sensor 2 for detecting an amount of depression $\theta_{AC}$ corresponding to how much the accelerator pedal is depressed by a driver. The amount of depression $\theta_{AC}$ of the accelerator pedal is a parameter corresponding to an acceleration request by the driver, i.e., a parameter corresponding to the output request to the engine 10. The information about the amount of depression $\theta_{AC}$ detected by the accelerator pedal sensor 2 is sent to the engine ECU 5.

The engine electronic control unit (engine ECU, control apparatus) 5 is an electronic control apparatus for controlling the amount of air and the amount of injecting fuel for each cylinder in the engine 10, and the ignition timings. The engine ECU 5 is constructed as an LSI device or an embedded electronic device in which a CPU, a microprocessor, an ROM, an RAM, and the like are integrated, for example. A "torque-based control" based on the magnitude of the torque requested to the engine 10 is performed in the engine ECU 5. Specific parameters controlled by the engine ECU 5 may include the amount of fuel from the injector 18 and the jetting timing by the injector 18, the ignition timing by the ignition plug 13, and the opening $\theta_{TH}$ of the throttle valve 27. The present embodiment will be described in the context of control (this control is called "intake amount control") of the engine torque by means of adjustment of the throttle opening $\theta_{TH}$.

2. CONFIGURATION FOR CONTROL

The engine ECU 5 totalizes a torque that is requested to the engine 10 and calculates a partial torque attainable by adjusting the amount of intake air out of the total torque. The partial torque is considered as a target torque $Pi_{TGT}$. The engine ECU 5 then controls the throttle opening $\theta_{TH}$ such that the air required for producing that target torque $Pi_{TGT}$ flows through the throttle valve 27. The variable valve mechanism 4, the air flow sensor 1, the accelerator pedal sensor 2, the crank angle sensor 3, the atmospheric pressure sensor 25, and the intake manifold pressure sensor 26 are connected to the input side of the engine ECU 5. The throttle valve 27 is connected to the output side of the engine ECU 5.

As set forth previously, the flow rate of the air flowing through the throttle valve 27 is represented as a product of the opening area S of the throttle valve 27 and the air flow velocity V (the flow rate=S*V), where the air flow velocity V is calculated based on the pressure ratio C (the ratio of the downstream pressure to the upstream pressure) of the throttle valve section. Therefore, once the amount of air required to produce the target torque $Pi_{TGT}$ is calculated, it becomes possible to calculate the throttle opening $\theta_{TH}$ by means of the ratio ($C=P_A/P_B$) of the downstream pressure $P_A$ detected by the intake manifold pressure sensor 26 and the upstream pressure $P_B$ detected by the atmospheric pressure sensor 25. On the contrary, the engine ECU 5 of the present embodiment has another function to calculate an appropriate throttle opening $\theta_{TH}$, without using the downstream and upstream pressures $P_A$ and $P_B$.

As shown in FIG. 1, the engine ECU 5 includes a first calculation unit 6, a second calculation unit 7, a third calculation unit 8, and a throttle opening control unit 9. The respective functions of the first calculation unit 6, the second calculation unit 7, the third calculation unit 8, and the throttle opening control unit 9 may be embodied by means of electronic circuits (hardware), or may be programmed (software), or a part of their functions may be provided in hardware and the remaining functions may be embodied in software.

[2-1. First Calculation Unit]

Figure 2:
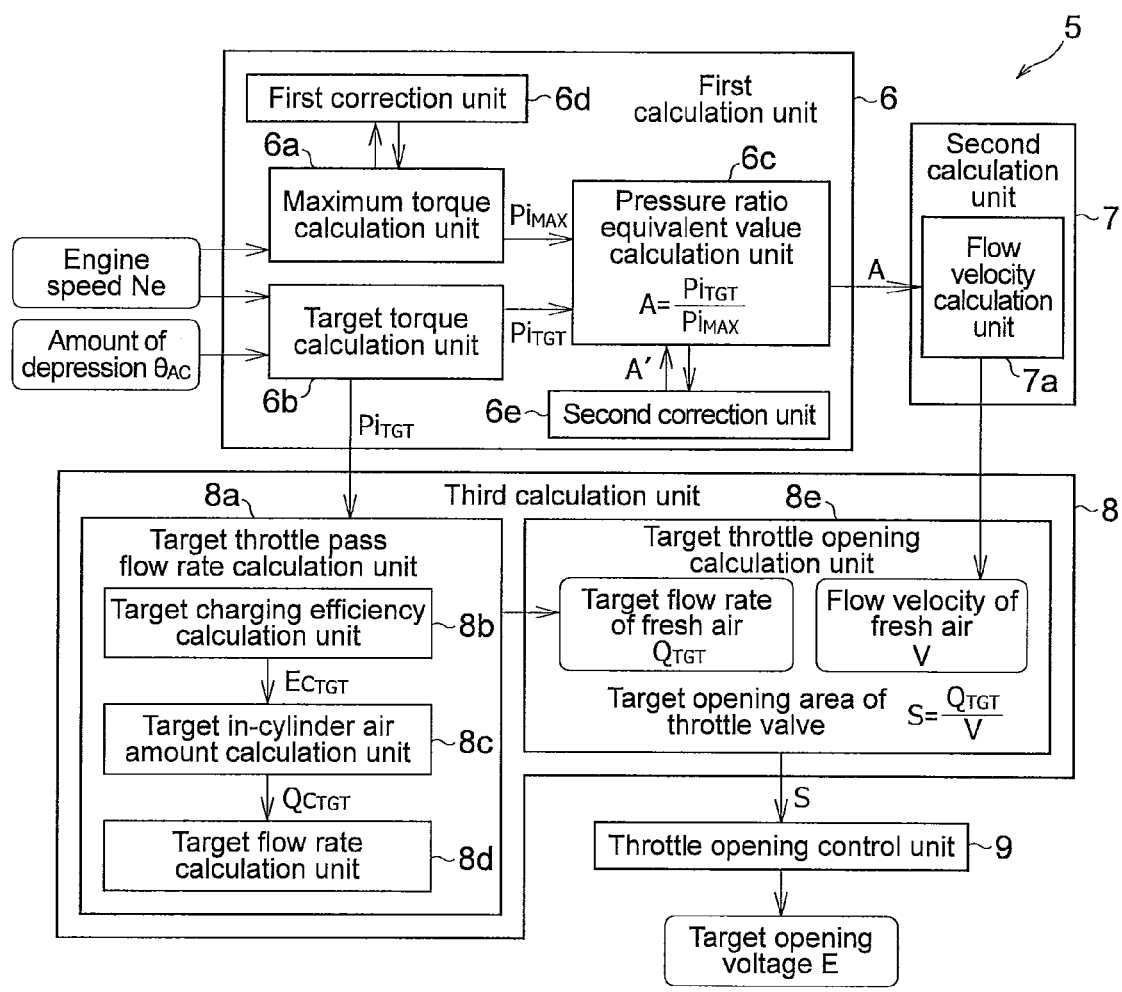
FIG. 2 is a block configuration diagram illustrating a calculation in the present control apparatus.

The first calculation unit 6 (first calculation device) calculates a pressure ratio equivalent value A which correlates to the actual pressure ratio C of the throttle valve section. As shown in FIG. 2, the first calculation unit 6 includes a maximum torque calculation unit 6a, a target torque calculation unit 6b, a pressure ratio equivalent value calculation unit 6c, a first correction unit 6d, and a second correction unit 6e.

The maximum torque calculation unit 6a calculates a maximum torque $Pi_{MAX}$ which the engine 10 can produce, based on the engine speed Ne detected (or calculated) by the crank angle sensor 3.

Figure 3:
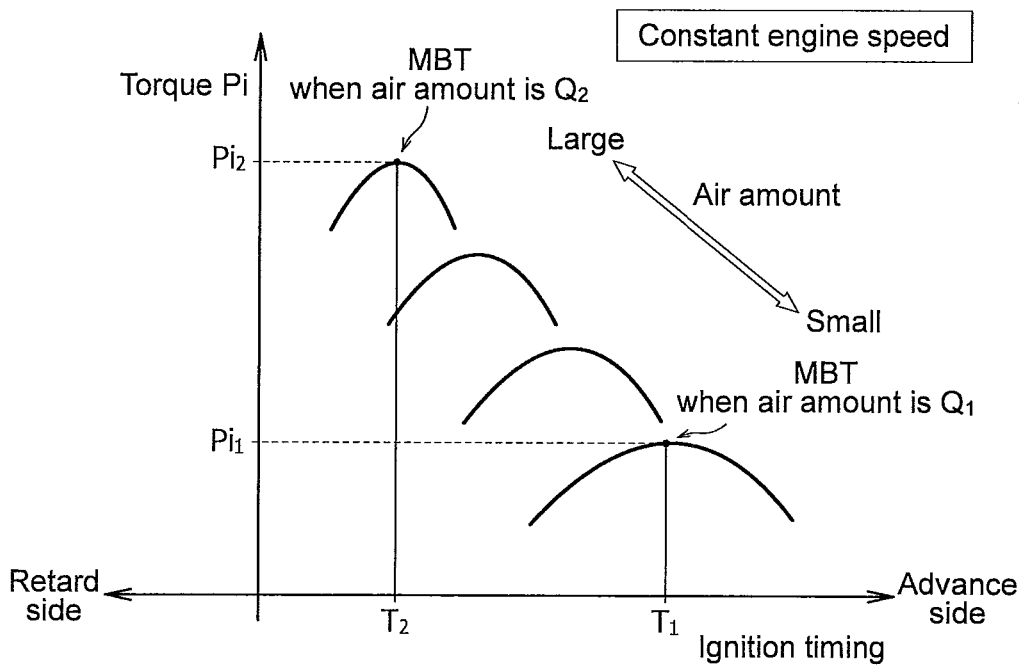
FIG. 3 is a graph illustrating the relationship among the actual charging efficiency Ec, the ignition timing, and the torque, in accordance with the present control apparatus.

Generally, the magnitude of the torque produced in the engine 10 varies, depending on the engine speed Ne, the amounts of the air or fuel introduced to the cylinder, the ignition timing, and the like. The magnitude of the torque produced with a predetermined air-fuel ratio at a predetermined engine speed is represented in a graph as shown in FIG. 3. For example, for an air amount of $Q_1$ and an ignition timing of $T_1$, the engine 10 outputs the maximum torque $Pi_1$. The curve representing the change in the torque with respect to the ignition timing is a convex upward curve. The maximum torque with an air amount of $Q_2$ is $Pi_2$, and the ignition timing for outputting that torque is $T_2$.

Figure 4:
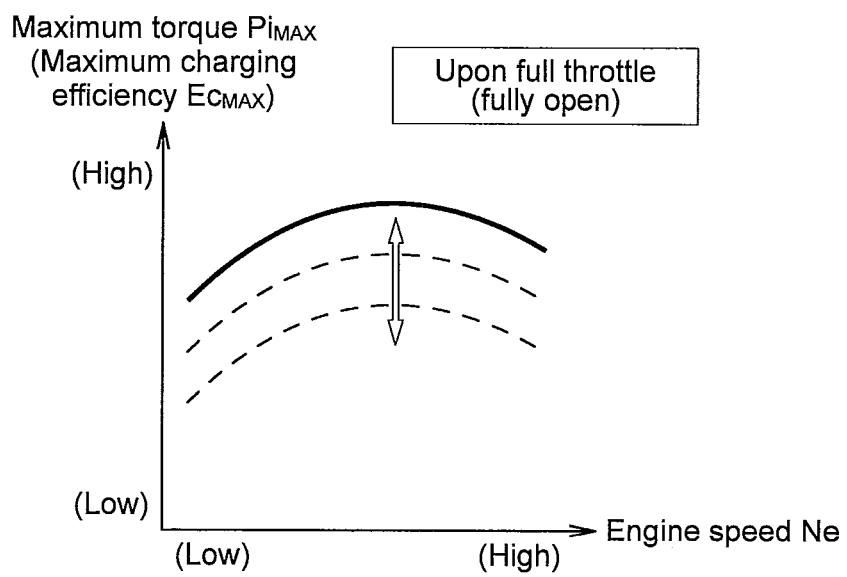
FIG. 4 is a graph illustrating the relationship between the maximum torque and the engine speed, in accordance with the present control apparatus.

Taking such relationships into account, the maximum torque calculation unit 6a calculates the maximum torque produced when the amount of intake air is maximized at the operational status at that time (the torque upon full throttle), as the maximum torque $Pi_{MAX}$. For example, as shown in the solid line in FIG. 4, the maximum torque $Pi_{MAX}$ may be calculated, using a graph or map defining the relation between the maximum torque $Pi_{MAX}$ and the engine speed Ne upon full throttle (in a situation that throttle valve 27 is fully open). The value of the maximum torque $Pi_{MAX}$ calculated by the maximum torque calculation unit 6a is sent to the pressure ratio equivalent value calculation unit 6c and the second correction unit 6e.

The ignition timing for producing the maximum torque in the engine 10, such as the ignition timing $T_1$ or $T_2$ shown in FIG. 3, is referred to as a minimum spark advance for best torque (MBT). The MBT shifts farther toward the retard side as the amount of the air introduced to the cylinder increases, whereas it shifts farther toward advance side as the amount of the air decreases. The MBT also shifts farther toward the retard side as the engine speed Ne becomes smaller, whereas it shifts farther toward advance side as the engine speed Ne becomes greater.

The maximum torque $Pi_{MAX}$ is calculated in the maximum torque calculation unit 6a as the torque produced when an ignition occurs at the MBT, in principle. However, if it is undesirable to set the ignition timing at the MBT, from the viewpoint of preventing knocking of the engine 10, the torque produced at a predetermined ignition timing slightly shifted to the retard side from the MBT, may be calculated as the maximum torque $Pi_{MAX}$. Knocking becomes less frequent as the ignition timing is retard (delayed) further, but the engine torque is reduced when the ignition timing is retard. Accordingly, it is preferable to set the predetermined ignition timing to the advance side closer to the MBT, within the ignition timing range substantially free from knocking.

When the ignition timing is shifted, the relation between the maximum torque $Pi_{MAX}$ and the engine speed Ne upon full throttle also varies. The location and the profile (graphical form) of the solid line graph in FIG. 4 also change. Meanwhile as shown in the broken lines in FIG. 4, the maximum torque $Pi_{MAX}$ corresponding to the ignition timings can be calculated by defining multiple plots corresponding to multiple ignition timings in advance. Accordingly, the maximum torque calculation unit 6a may calculate the maximum torque $Pi_{MAX}$ in accordance with the engine speed Ne and the ignition timing.

As for the air-fuel ratio, the maximum torque $Pi_{MAX}$ is preferably calculated assuming a preset (predetermined) air-fuel ratio, not the actual air-fuel ratio at that time. For example, even when the actual air-fuel ratio is a lean air-fuel ratio, an estimate of the engine output at the stoichiometric air-fuel ratio (air-fuel ratio around 14.7) or the best air-fuel ratio for power (air-fuel ratio with a range about from 12.0 to 13.0 where a higher output is obtained) may be calculated as the maximum torque $Pi_{MAX}$.

Similarly to the ignition timing, a calculated maximum torque $Pi_{MAX}$ varies if an air-fuel ratio used for calculation of the maximum torque $Pi_{MAX}$ is different. By defining multiple plots corresponding to multiple air-fuel ratios in advance, as shown in the broken lines in FIG. 4, the maximum torque $Pi_{MAX}$ corresponding to the air-fuel ratios can be calculated. Accordingly, the maximum torque calculation unit 6a may calculate the maximum torque $Pi_{MAX}$ in accordance with the engine speed Ne and the air-fuel ratio.

Furthermore, this applies to the valve lift degrees or the valve timings of the intake and exhaust valves 14 and 15. The maximum torque $Pi_{MAX}$ at the optimum valve timing or the optimum valve lift degree (i.e., the valve lift degree or the valve timing that produces the maximum torque in the engine) may be calculated. Alternatively, the maximum torque $Pi_{MAX}$ produced in the engine 10 at the actual valve lift degree or the actual valve timing at that timing may be calculated. In such a case, by defining multiple plots corresponding to multiple valve lift degrees and multiple valve timings in advance, as shown in the broken lines in FIG. 4, the maximum torque $Pi_{MAX}$ corresponding to the multiple valve lift degrees and multiple valve timings can be calculated. Accordingly, the maximum torque calculation unit 6a may calculate the maximum torque $Pi_{MAX}$ according to the engine speed Ne, the valve lift degree, and the valve timing.

The symbol Pi in FIG. 3 denotes "indicated mean effective pressure (IMEP)". The IMEP is a value of pressure obtained by dividing the work calculated based on the indicator diagram (e.g., pressure-volume diagram) of the engine 10 by the displacement volume. Here, it represents the magnitude of the torque by means of the IMEP. In the present embodiment, the term "torque" not only refers to the momentum of the rotation produced in the engine 10, but the torque equivalent magnitude (pressure corresponding to the torque) represented by the mean effective pressure (e.g., the IMEP (Pi) or BMEP (the brake mean effective pressure, Pe) or FMEP (Friction mean effective pressure)) applied on the piston 16 of the engine 10 is also referred to as a "torque", for convenience.

The target torque calculation unit 6b calculates the target torque $Pi_{TGT}$, based on the engine speed Ne detected (or calculated) by the crank angle sensor 3 and the amount of depression $\theta_{AC}$ detected by the accelerator pedal sensor 2. Similar to the maximum torque $Pi_{MAX}$, this target torque $Pi_{TGT}$ is a value obtained by converting the target of the torque in an intake amount control into the IMEP Pi. The value of the target torque $Pi_{TGT}$ calculated by the target torque calculation unit 6b is sent to the pressure ratio equivalent value calculation unit 6c and the third calculation section 8.

The pressure ratio equivalent value calculation unit 6c calculates the pressure ratio equivalent value A, based on the maximum torque $Pi_{MAX}$ calculated by the maximum torque calculation unit 6a and the target torque $Pi_{TGT}$ calculated by the target torque calculation unit 6b. The pressure ratio equivalent value A is given as the ratio of the target torque $Pi_{TGT}$ to the maximum torque $Pi_{MAX}$ ($A=Pi_{TGT}/Pi_{MAX}$). The pressure ratio equivalent value A calculated by the pressure ratio equivalent value calculation unit 6c is sent to the second correction unit 6e and the second calculation unit 7.

Figure 5A:
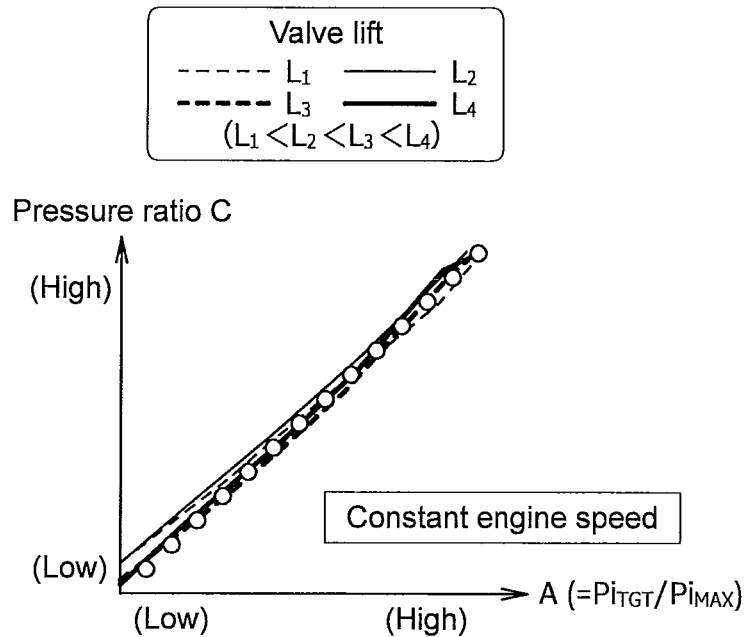
FIG. 5A is a graph illustrating the correlation between the pressure ratio equivalent value and the actual pressure ratio in accordance with the present control apparatus, which uses the pressure ratio equivalent value calculated based on the indicated mean effective pressure.

Here, a graph illustrating the relationship between the pressure ratio equivalent value A and the actual pressure ratio C of the throttle valve section through an engine test done by the present inventors is shown in FIG. 5A. This graph plots the relationship between the pressure ratio equivalent value A and the pressure ratio C when varying the valve lift degree of the intake valve 14 while maintaining the engine speed Ne and the air-fuel ratio to be constant. The horizontal axis indicates the pressure ratio equivalent value A and vertical axis indicates the pressure ratio C. The white circles plotted in dots indicate points where the pressure ratio equivalent value A equals the pressure ratio C (Each white circles is plotted on a linear graph of C=A).

In this engine test, the valve lift degree of the intake valve 14 is gradually increased to $L_1$, $L_2$, $L_3$, and $L_4$ in a step-wise manner, and the respective results are shown in the graphs of the thin broken line, the thin solid line, the thick broken line, the thick solid line, respectively. These four graphs are substantially aligned with the dotted white circles. In other words, there is a correlation between the pressure ratio equivalent value A and the pressure ratio C, independent from the valve lift degree. For this reason, the throttle opening $\theta_{TH}$ can be calculated by use of the pressure ratio equivalent value A, in place of the pressure ratio C.

Using the pressure ratio equivalent value A as an alternative value for the pressure ratio C means that the pressure ratio C and the pressure ratio equivalent value A are assumed to be always equal to each other. Strictly speaking, however, the graphs in FIG. 5A do not match a straight line of C=A completely. For improving the reliability as an alternative value of the pressure ratio C, a pressure ratio equivalent value A' may be calculated which is obtained as a result of correcting the discrepancy between the pressure ratio equivalent value A and the pressure ratio C. Alternatively, the value used for calculating the pressure ratio equivalent value A, such as the target torque $Pi_{TGT}$ and the maximum torque $Pi_{MAX}$, may be corrected to establish a closer correlation between the pressure ratio equivalent value A and the pressure ratio C.

The first correction unit 6d performs the latter correction. For example, the first correction unit 6d stores the effects of the air-fuel ratio, the valve timing, the valve lift degree, and the like, on the maximum torque $Pi_{MAX}$. The first correction unit 6d calculates a corrected maximum torque $Pi_{MAX}'$ in accordance with the operational status of the engine 10 and the control status of the intake and exhaust valves 14 and 15, and sends the corrected value to the maximum torque calculation unit 6a. In this case, the maximum torque calculation unit 6a may send the corrected maximum torque $Pi_{MAX}'$ sent from the first correction unit 6d, to the pressure ratio equivalent value calculation unit 6c, instead of the maximum torque $Pi_{MAX}$.

The second correction unit 6e performs the former correction. For example, the second correction unit 6e stores relations between the pressure ratio C and the pressure ratio equivalent value A, for each engine speed Ne, each valve timing, and each valve lift degree, as shown in FIG. 5A. The second correction unit 6e calculates the pressure ratio A' corresponding to the pressure ratio equivalent value A calculated by the pressure ratio equivalent value calculation unit 6c, and sends it to the pressure ratio equivalent value calculation unit 6c. In this case, the pressure ratio equivalent value calculation unit 6c may send the pressure ratio A' sent from the second correction unit 6e, to the second calculation unit 7, instead of the pressure ratio equivalent value A.

[2-2. Second Calculation Unit]

Figure 6:
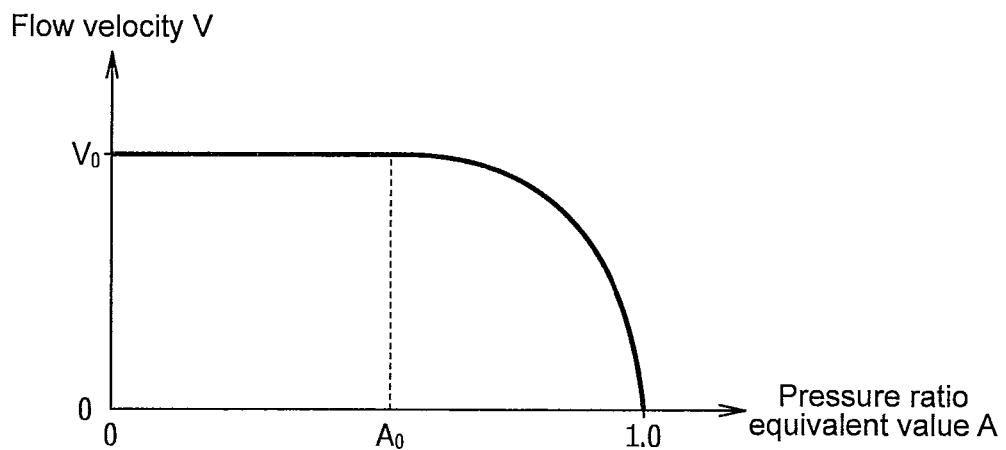
FIG. 6 is a graph illustrating the relationship between the pressure ratio equivalent value and the flow velocity, in accordance with the present control apparatus.

The second calculation unit 7 (second calculation device) includes a flow velocity calculation unit 7a that calculates the flow velocity V of the air flowing through the throttle valve 27, based on the pressure ratio equivalent value A sent from the first calculation unit 6. The flow velocity calculation unit 7a stores a map or table or mathematical formulae defining the fluctuation in the flow velocity toward the varying pressure ratio. For example, the air flow velocity V is calculated based on the relationship between the pressure ratio equivalent value A and the flow velocity V as shown in FIG. 6. The flow velocity V calculated by the second calculation unit 7 is sent to the third calculation unit 8.

Note that the flow velocity of a compressive fluid (fluid of which density varies depending on a pressure change) flowing through an orifice in a tube decreases as a pressure ratio before and after orifice (a ratio of the downstream pressure to the upstream pressure) increases in general. Once the pressure ratio falls below the critical pressure ratio, the flow velocity remains constant. Considering such characteristics, the graph in FIG. 6 defines the pressure ratio equivalent value A in a range of $0 \leq A \leq 1$, where the flow velocity V is set to 0 for a pressure ratio equivalent value A of 1. The flow velocity V is increased as the pressure ratio equivalent value A reduces. The flow velocity V is set to the upper limit $V_0$ when the pressure ratio equivalent value A falls below the critical pressure ratio $A_0$.

[2-3. Third Calculation Unit]

The third calculation unit 8 (third calculation device) calculates the amount of air for producing the target torque $Pi_{TGT}$ calculated by the first calculation unit 6, and calculates the target opening of the throttle valve 27, based on that air amount and the flow velocity V calculated by the second calculation unit 7. The third calculation unit 8 includes a target throttle pass flow rate calculation unit 8a and a target throttle opening calculation unit 8e.

The target throttle pass flow rate calculation unit 8a calculates a target flow rate $Q_{TGT}$ of fresh air required for producing the target torque $Pi_{TGT}$ calculated by the first calculation unit 6. The target throttle pass flow rate calculation unit 8a includes a target charging efficiency calculation unit 8b, a target in-cylinder air amount calculation unit 8c, and a target flow rate calculation unit 8d.

The target charging efficiency calculation unit 8b calculates a target charging efficiency $Ec_{TGT}$ corresponding to the target torque $Pi_{TGT}$ sent from the target torque calculation unit 6b. Here, the target charging efficiency $Ec_{TGT}$ is calculated based on a preset relation map, mathematical formulae, and the like, which defines a relation between the target torque $Pi_{TGT}$ and the target charging efficiency $Ec_{TGT}$. The target charging efficiency $Ec_{TGT}$ calculated by the target charging efficiency calculation unit 8b is sent to the target in-cylinder air amount calculation unit 8c.

Note that the symbol Ec represents "charging efficiency". The charging efficiency Ec is obtained by normalizing the volume of the air filled in the cylinder during a single intake stroke (a single stroke in which the piston 16 moves from the top dead center to the bottom dead center) into the gas volume in the standard condition, and dividing the normalized value by the cylinder volume. The charging efficiency Ec corresponds to the amount of the air introduced in the cylinder during this stroke, and the target charging efficiency $Ec_{TGT}$ is a desired value of charging efficiency Ec to generate the target torque $Pi_-$. The target charging efficiency $Ec_{TGT}$ corresponds to the target air amount.

The target in-cylinder air amount calculation unit 8c performs a calculation for converting the target charging efficiency $Ec_{TGT}$ calculated by the target charging efficiency calculation unit 8b into a target amount $Qc_{TGT}$ of the air to be introduced into the cylinder. Here, the target amount $Qc_{TGT}$ is calculated based on a preset relation map, mathematical formulae, and the like, which defines a relation between the target charging efficiency $Ec_{TGT}$ and the target amount $Qc_{TGT}$. The target amount $Qc_{TGT}$ calculated by the target in-cylinder air amount calculation unit 8c is sent to the target flow rate calculation unit 8d. Alternatively, the target charging efficiency calculation unit 8b may perform the calculation instead of the target in-cylinder air amount calculation unit 8c.

The target flow rate calculation unit 8d calculates a target flow rate $Q_{TGT}$ of fresh air, which is a target air amount to be passed through the throttle valve 27, from the target air amount $Qc_{TGT}$ to be introduced into the cylinder. Here, the target flow rate $Q_{TGT}$ is calculated based on a preset physical model, mathematical formulae, and the like, considering the delay of air intake resulting from the volume of the surge tank 21. The target flow rate $Q_{TGT}$ calculated by the target flow rate calculation unit 8d is sent to the target throttle opening calculation unit 8e.

The target throttle opening calculation unit 8e calculates a target opening area S of the throttle valve 27, based on the target flow rate $Q_{TGT}$ calculated by the target throttle pass flow rate calculation unit 8a and the flow velocity V calculated by the flow velocity calculation unit 7a. The target opening area S is calculated by dividing the target flow rate $Q_{TGT}$ by the flow velocity V, as shown in FIG. 2, for example. The target opening area S calculated by the target throttle opening calculation unit 8e is sent to the throttle opening control unit 9.

[2-4. Throttle Opening Control Unit]

Figure 7:
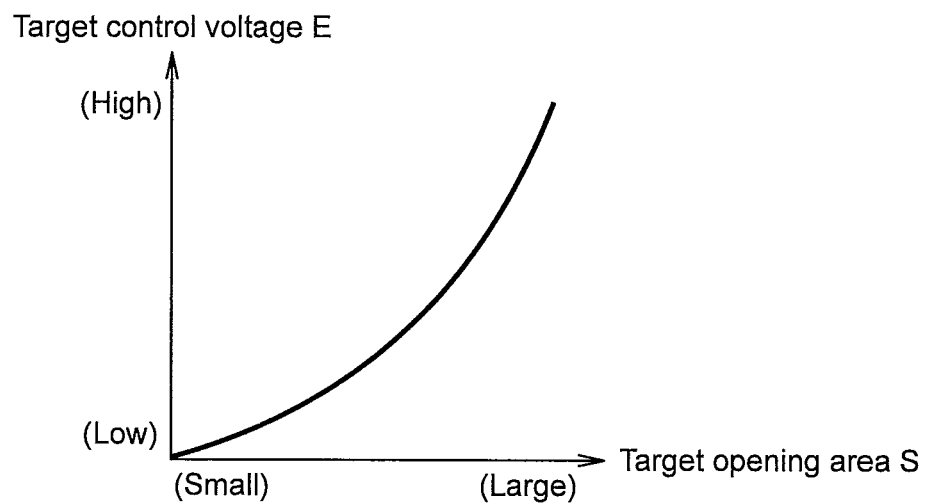
FIG. 7 is a graph illustrating the relationship between the target opening area and the target opening voltage, in accordance with the present control apparatus.

The throttle opening control unit 9 outputs a control signal to the throttle valve 27 to control the opening of the throttle valve 27 to be equal to the target opening area S calculated by the third calculation unit 8. Here, the target opening voltage E is calculated based on a preset relation map, mathematical formulae, and the like, which defines a relation between the target opening area S and the target opening voltage E, and the target opening voltage E is output to the throttle valve 27, as a control signal. Note that the relationship between the target opening area S and the target opening voltage E is defined according to the structure, shape, type of the throttle valve 27. When it comes to a normal throttle valve 27 which opens wider with an increase in the opening voltage, the target opening voltage E may be raised as the target opening area S become greater, as shown in FIG. 7, for example.

In response to the control signal from the throttle opening control unit 9, the throttle opening $\theta_{TH}$ of the throttle valve 27 is controlled to achieve the target opening area S. Thereby, once the flow rate of the air flowing toward the intake manifold 20 reaches the target flow rate $Q_{TGT}$, the charging efficiency Ec of the cylinder reaches the target charging efficiency $Ec_{TGT}$, which sets the torque output from the engine 10 to the target torque $Pi_{TGT}$. The engine ECU 5 performs an intake amount control in the above-described manner.

3. ADVANTAGES AND EFFECTS

In the above-described control apparatus for the engine 10, the pressure ratio equivalent value A is calculated, in place of the actual pressure ratio C of the throttle valve section, in the pressure ratio equivalent value calculation unit 6c in the first calculation unit 6. Then, in the flow velocity calculation unit 7a in the second calculation unit 7, the flow velocity V of the air flowing through the throttle valve 27 is calculated, based on the pressure ratio equivalent value A. Thereby, in the target throttle opening calculation unit 8e in the third calculation unit 8, the target opening area S can be calculated to resolve and set the target opening of the throttle valve 27, without using the downstream and upstream pressures $P_A$ and $P_B$ of the throttle valve section.

In addition, as shown in FIG. 5A, since the pressure ratio equivalent value A exhibits a correlation with the pressure ratio C of the throttle valve section, a target opening area S can be calculated precisely in the target throttle opening calculation unit 8e, to set the target opening of the throttle valve 27 in a proper range.

Furthermore, calculation of the target opening can be simplified by use of the correlation between the pressure ratio equivalent value A and the pressure ratio C. No complex map or table corresponding to a wide variety of operational status of the engine 10 is required. Such a plain construction helps to save the ROM space for storing data used for calculation of the target opening of the throttle valve 27.

Particularly, the first calculation unit 6 includes the second correction unit 6e in the above-described control apparatus. The maximum torque $Pi_{MAX}$ is calculated in accordance with the air-fuel ratio, the valve lift degree, and the valve timing in the second correction unit 6e. Therefore the target opening of the throttle valve 27 can be precisely set, based on the combustion mode, such as the lean-burn operation and stoichiometric operation, or the control status of the intake and exhaust valves 14 and 15.

This applies to the configuration in which the maximum torque $Pi_{MAX}$ is calculated based on the ignition timing, the air-fuel ratio, the valve lift degree, or the valve timing, in the maximum torque calculation unit 6a. The target opening of the throttle valve 27 can be precisely conformed to the combustion mode or the operational status of the engine 10, or the control status of the intake and exhaust valves 14 and 15, at the time of the calculation.

In addition, as for the calculation of the pressure ratio equivalent value A, the above-described control apparatus calculates the pressure ratio equivalent value A, using the maximum torque $Pi_{MAX}$ and the target torque $Pi_{TGT}$ at that time. The maximum torque $Pi_{MAX}$ and the target torque $Pi_{TGT}$ are parameters which may be used for other torque-based controls than the intake amount control, such as controls on the amount of jetted fuel, the jetting timing, the ignition timing. Accordingly, the control apparatus is advantageous in that calculation values can be reused or recycled for other controls, and that a control program or algorithm can be simplified.

In addition, as for the calculation of the maximum torque $Pi_{MAX}$, the maximum torque calculation unit 6a calculates, in principle, the torque produced in the engine 10 at the ignition timing of the MBT, as the maximum torque $Pi_{MAX}$. That is, even if the actual ignition timing is not the MBT, the maximum torque which can be generated by the engine 10 at that time is calculated as the maximum torque $Pi_{MAX}$. This can strengthen the correlation between the pressure ratio equivalent value A and the actual pressure ratio C, and accordingly the accuracy of calculating the target opening of the throttle valve 27 can be improved.

On the other hand, even if it is undesirable to set the ignition timing at the MBT, for example, the torque produced at a predetermined ignition timing slightly shifted to the retard side from the MBT is calculated as the maximum torque $Pi_{MAX}$. Accordingly, this also can strengthen the correlation between the pressure ratio equivalent value A and the actual pressure ratio C, and accordingly the accuracy of calculating the target opening of the throttle valve 27 can be improved.

Advantageously, calculating the pressure ratio equivalent value A, using the maximum torque $Pi_{MAX}$ and the target torque $Pi_{TGT}$ of the engine 10 can easily simplify elements for the calculation.

Furthermore, when the maximum torque $Pi_{MAX}$ is calculated under a constant predetermined air-fuel ratio, such as the stoichiometric air-fuel ratio or the best air-fuel ratio for power, for example, the effect of variation of the torque resulting from the air-fuel ratio can be eliminated, which further strengthens the correlation between the pressure ratio equivalent value A and the actual pressure ratio C.

4. VARIANTS

[4-1. Calculation of A, Using Ec]

The present embodiment may be practiced in variants and modifications without departing from the spirit of the present embodiment. Constructions of the present embodiment may be selected or suitably combined where necessary. Although the above-described control apparatus calculates the pressure ratio equivalent value A, using the maximum torque $Pi_{MAX}$ and the target torque $Pi_{TGT}$ of the engine 10, a similar calculation may be performed using the amount of the air introduced to the cylinder, in place of the torque.

For example, it is possible that a second pressure ratio equivalent value B may be calculated using a maximum charging efficiency $Ec_{MAX}$ and a target charging efficiency $Ec_{TGT}$, in place of the maximum torque $Pi_{MAX}$ and the target torque $Pi_{TGT}$ in the above-described embodiment, and the flow velocity V of the air flowing through the throttle valve 27 may be calculated based on this second pressure ratio equivalent value B.

The maximum charging efficiency $Ec_{MAX}$ is the charging efficiency Ec corresponding to the maximum torque $Pi_{MAX}$ in the above-described embodiment, and is the charging efficiency Ec calculated, based on the amount of the air required for producing the maximum torque $Pi_{MAX}$ in the engine 10 (the charging efficiency Ec upon full throttle).

The target charging efficiency $Ec_{TGT}$ is the charging efficiency Ec corresponding to the target torque $Pi_{TGT}$, and is the charging efficiency Ec calculated, based on the amount of the air required for producing the target torque $Pi_{TGT}$ in the engine 10. From these parameters, the ratio of the target charging efficiency $Ec_{TGT}$ to the maximum charging efficiency $Ec_{MAX}$ can be defined as the second pressure ratio equivalent value B ($B = Ec_{TGT}/Ec_{MAX}$).

Figure 5B:
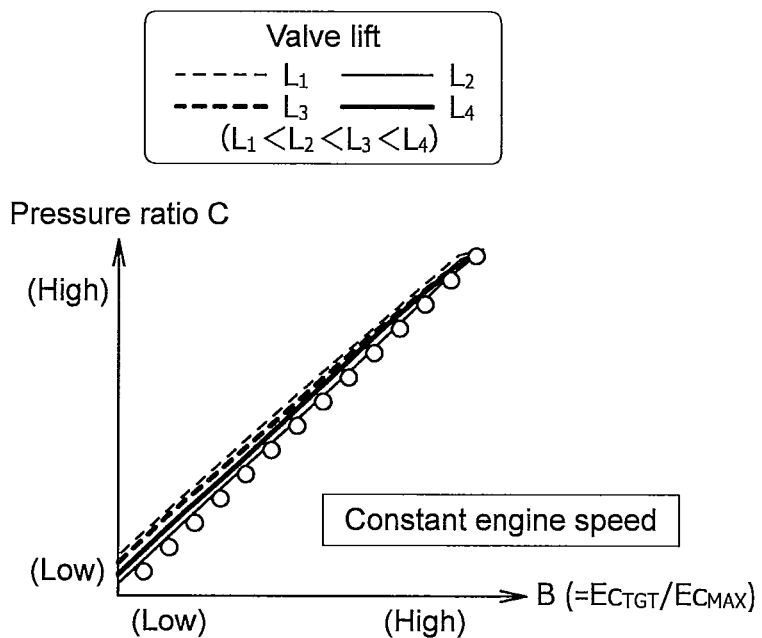
FIG. 5B is a graph illustrating the correlation between the pressure ratio equivalent value and the actual pressure ratio in accordance with the present control apparatus, which uses the pressure ratio equivalent value calculated based on the charging efficiency.

Here, a graph illustrating the relationship between the second pressure ratio equivalent value B and the actual pressure ratio C of the throttle valve section through an engine test done by the present inventors is shown in FIG. 5B. Similar to FIG. 5A, this graph plots the relationship between the second pressure ratio equivalent value B and the pressure ratio C when varying the valve lift degree of the intake valve 14 while maintaining the engine speed Ne and the air-fuel ratio to be constant.

The four graphs with different valve lifts are substantially aligned with the dotted white circles. The second pressure ratio equivalent value B is correlates with the pressure ratio C and this correlation is, independent from the valve lift degree. For this reason, the throttle opening $\theta_{TH}$ can be calculated using the second pressure ratio equivalent value B, in place of the pressure ratio C.

Figure 8:
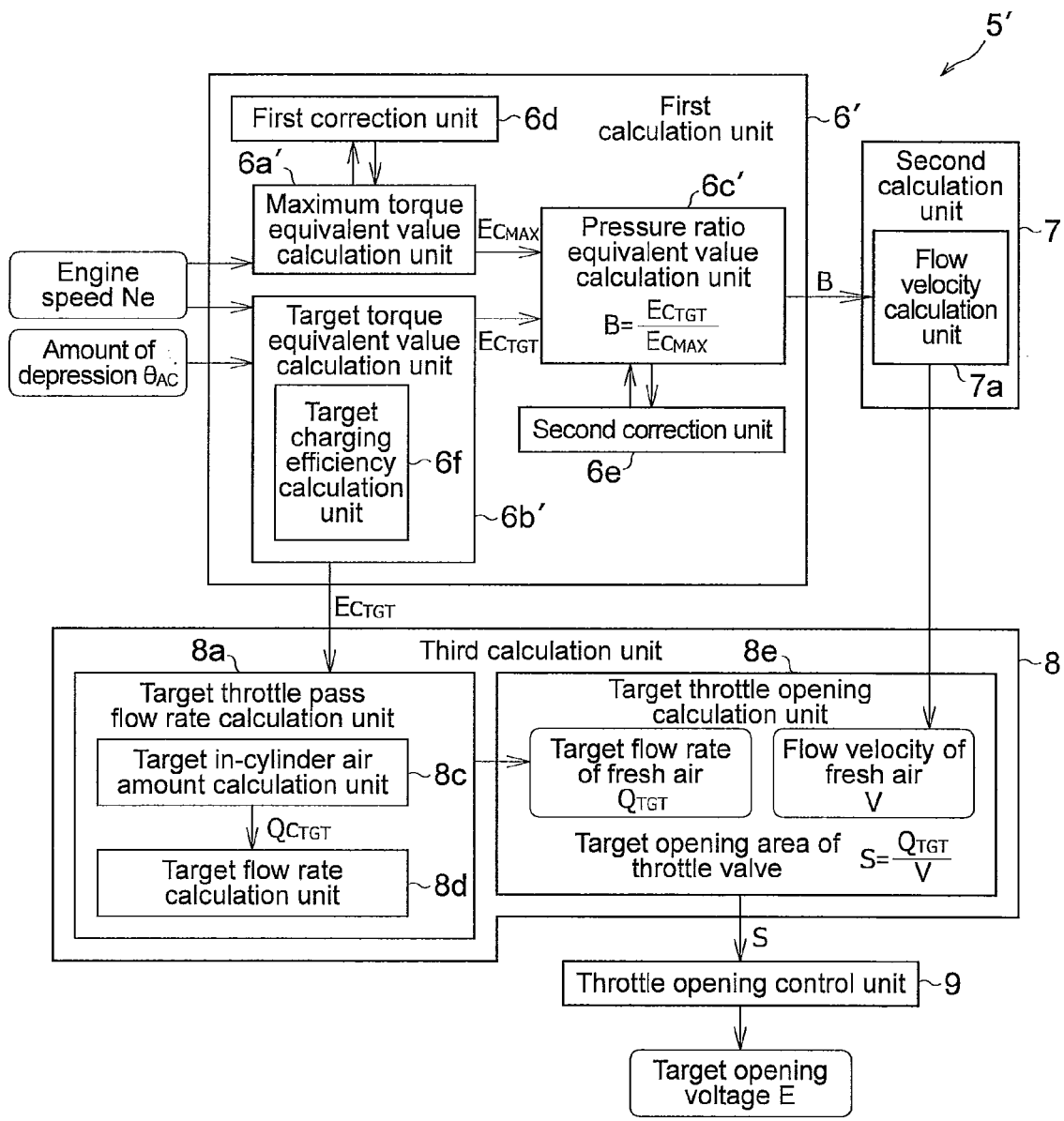
FIG. 8 is a block configuration diagram illustrating calculation in a control apparatus as a variant.

The block configuration of an engine ECU 5' as such a variant is illustrated in FIG. 8. The engine ECU 5' includes a first calculation unit 6', a second calculation unit 7, a third calculation unit 8, and a throttle opening control unit 9. The target charging efficiency calculation unit 8b in the above-described embodiment is migrated to the first calculation unit 6. The elements described in the above-described embodiment are referenced to by same signs and their descriptions will be omitted.

The first calculation unit 6' (first calculation device) calculates the second pressure ratio equivalent value B. The first calculation unit 6' includes a maximum torque equivalent value calculation unit 6a', a target torque equivalent value calculation unit 6b', a pressure ratio equivalent value calculation unit 6c', a first correction unit 6d, and a second correction unit 6e.

The maximum torque equivalent value calculation unit 6a' calculates the maximum charging efficiency $Ec_{MAX}$, based on the engine speed Ne detected (or calculated) by the crank angle sensor 3. A technique to calculate the maximum charging efficiency $Ec_{MAX}$ may use a graph or map defining a relation between the maximum charging efficiency $Ec_{MAX}$ and the engine speed Ne upon full throttle, as indicated in the solid line in FIG. 4, for example. The maximum charging efficiency $Ec_{MAX}$ calculated by the maximum torque equivalent value calculation unit 6a' is sent to the pressure ratio equivalent value calculation unit 6c' and the first correction unit 6d.

The target torque equivalent value calculation unit 6b' calculates the target torque $Pi_{TGT}$, based on the engine speed Ne detected (or calculated) by the crank angle sensor 3 and the amount of depression $\theta_{AC}$ detected by the accelerator pedal sensor 2, and calculates the charging efficiency Ec calculated based on the air amount corresponding to the target torque $Pi_{TGT}$, as the target charging efficiency $Ec_{TGT}$. The target torque equivalent value calculation unit 6b' includes a target charging efficiency calculation unit 6f that performs a calculation similar to that in the target charging efficiency calculation unit 8b in the above-described embodiment. The target charging efficiency calculation unit 6f calculates the target charging efficiency $Ec_{TGT}$. The target charging efficiency $Ec_{TGT}$ calculated by the target torque equivalent value calculation unit 6b' is sent to the third calculation unit 8 and the pressure ratio equivalent value calculation unit 6c'.

The pressure ratio equivalent value calculation unit 6c' calculates the second pressure ratio equivalent value B, based on the maximum charging efficiency $Ec_{MAX}$ calculated by the maximum torque equivalent value calculation unit 6a' and the target charging efficiency $Ec_{TGT}$ calculated by the target torque equivalent value calculation unit 6b'. The second pressure ratio equivalent value B is given as the ratio of the target charging efficiency $Ec_{TGT}$ to the maximum charging efficiency $Ec_{MAX}$ ($B = Ec_{TGT}/Ec_m$). The second pressure ratio equivalent value B calculated by the pressure ratio equivalent value calculation unit 6c' is sent to the second correction unit 6e and the second calculation unit 7.

In the control apparatus for the engine 10 as configured above, the second pressure ratio equivalent value B is calculated, in place of the actual pressure ratio C of the throttle valve section, in the pressure ratio equivalent value calculation unit 6c' in the first calculation unit 6. Then, in the flow velocity calculation unit 7a in the second calculation unit 7, the flow velocity V of the air flowing through the throttle valve 27 is calculated, based on the second pressure ratio equivalent value B. Thereby, in the target throttle opening calculation unit 8e in the third calculation unit 8, the target opening area S can be calculated to resolve and set the target opening of the throttle valve 27, without using the downstream and upstream pressures $P_A$ and $P_B$ of the throttle valve section.

In addition, as shown in FIG. 5B, since the second pressure ratio equivalent value B exhibits a correlation with the pressure ratio C of the throttle valve section, a target opening area S can be calculated precisely in the target throttle opening calculation unit 8e, to set the appropriate target opening of the throttle valve 27.

Furthermore, calculation of the target opening can be simplified by use of the correlation between the second pressure ratio equivalent value B and the pressure ratio C. No complex map or table corresponding to a wide variety of operational status of the engine 10 is required. Such a plain construction helps to save the ROM space for storing data used for calculation of the target opening of the throttle valve 27.

Even when the maximum charging efficiency $Ec_{MAX}$ and the target charging efficiency $Ec_{TGT}$ are used, it is possible to perform a calculation similar to the one using the maximum torque $Pi_{MAX}$ and the target torque $Pi_{TGT}$ of the engine 10 and elements for the calculation are simplified easily.

[4-2. Miscellaneous]

The above-described embodiment has been described in the context in which the throttle opening $\theta_{TH}$ is calculated without using the downstream pressure $P_A$ detected by the intake manifold pressure sensor 26 and the upstream pressure $P_B$ detected by the atmospheric pressure sensor 25. However, the throttle opening $\theta_{TH}$ may also be calculated by additionally using the downstream and upstream pressures $P_A$ and $P_B$. For example, in the second calculation unit 7, the flow velocity V may be calculated using the pressure ratio C during normal operations, and the flow velocity V may be calculated using the pressure ratio equivalent value A if a fail signal is received from either of the intake manifold pressure sensor 26 or the atmospheric pressure sensor 25. In this configuration, a more accurate throttle control can be obtained even upon a failure or malfunction of any of the sensors, which improves the reliability of the intake amount control.

Although the pressure ratio equivalent value A is calculated using the maximum torque $Pi_{MAX}$ and the target torque $Pi_{TGT}$ represented by the indicated mean effective pressure (IMEP) Pi in the above-described embodiment, a particular technique to calculate the pressure ratio equivalent value A is not limited to this. For example, the pressure ratio equivalent value A may be calculated using the brake mean effective pressure (BMEP) Pe or the torque value generated at the crank shaft 17, in place of the indicated mean effective pressure (IMEP) Pi. Alternatively, the second pressure ratio equivalent value B may be calculated using the amount of the air (the volume or mass of the air), in place of the charging efficiency Ec, in the above-described variant.

REFERENCE SIGNS LIST

1 AIR FLOW SENSOR
2 ACCELERATOR PEDAL SENSOR
3 CRANK ANGLE SENSOR
4 VARIABLE VALVE MECHANISM
5 ENGINE ECU (CONTROL APPARATUS)
6 FIRST CALCULATION UNIT (FIRST CALCULATION DEVICE)
7 SECOND CALCULATION UNIT (SECOND CALCULATION DEVICE)
8 THIRD CALCULATION UNIT (THIRD CALCULATION DEVICE)
9 THROTTLE OPENING CONTROL UNIT
27 THROTTLE VALVE

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A control apparatus for an engine, comprising:
a first calculation device having a maximum torque calculation unit, a target torque calculation unit, and a pressure ratio equivalent value calculation unit, the maximum torque calculation unit calculating a maximum torque produced in the engine at an ignition timing of a minimum spark advance for best torque, as a maximum torque equivalent value of the engine, the target torque calculation unit calculating a target torque based on an engine speed and an amount of depression detected by an accelerator pedal sensor, as a target torque equivalent value, the pressure ratio equivalent value calculation unit calculating a ratio of the target torque equivalent value of the engine to the maximum torque equivalent value of the engine, as a pressure ratio equivalent value which is equivalent to a ratio of a downstream pressure to an upstream pressure of a throttle valve;
a second calculation device that calculates a flow velocity of air to flowing through the throttle valve in the engine, based on the pressure ratio equivalent value calculated by the first calculation device; and
a third calculation device that calculates a target throttle valve opening, based on the flow velocity calculated by the second calculation device,
wherein the second calculation device defines the pressure ratio equivalent value in a range greater than or equal to 0 and less than or equal to 1, where a flow velocity is set to 0 for the pressure ratio equivalent value of 1, the flow velocity is increased as the pressure ratio equivalent value reduces, and the flow velocity is set to an upper limit when the pressure ratio equivalent value falls below a critical pressure ratio.

2. The control apparatus for an engine according to claim 1, wherein the first calculation device calculates the maximum torque equivalent value in accordance with valve lift degrees or valve timings of intake or exhaust valve.

3. The control apparatus for an engine according to claim 1, wherein the first calculation device calculates a torque produced in the engine with the amount of air introduced to the engine, as the maximum torque equivalent value, and calculates a target torque set based on an output request to the engine, as the target torque equivalent value.

4. The control apparatus for an engine according to claim 2, wherein the first calculation device calculates a torque produced in the engine with the amount of air introduced to the engine, as the maximum torque equivalent value, and calculates a target torque set based on an output request to the engine, as the target torque equivalent value.

5. The control apparatus for an engine according to claim 3, wherein the first calculation device calculates a maximum torque produced in the engine during combustion at a preset air-fuel ratio, as the maximum torque equivalent value.

6. The control apparatus for an engine according to claim 4, wherein the first calculation device calculates a maximum torque produced in the engine during combustion at a preset air-fuel ratio, as the maximum torque equivalent value.

7. The control apparatus for an engine according to claim 1, wherein the first calculation device calculates the pressure ratio equivalent value, using a maximum charging efficiency of the engine as the maximum torque equivalent value, and using a target charging efficiency calculated based on the air amount as the target torque equivalent value.

8. The control apparatus for an engine according to claim 2, wherein the first calculation device calculates the pressure ratio equivalent value, using a maximum charging efficiency of the engine as the maximum torque equivalent value, and using a target charging efficiency calculated based on the air amount as the target torque equivalent value.

9. The control apparatus for an engine according to claim 3, wherein the first calculation device calculates the pressure ratio equivalent value, using a maximum charging efficiency of the engine as the maximum torque equivalent value, and using a target charging efficiency calculated based on the air amount as the target torque equivalent value.

10. The control apparatus for an engine according to claim 4, wherein the first calculation device calculates the pressure ratio equivalent value, using a maximum charging efficiency of the engine as the maximum torque equivalent value, and using a target charging efficiency calculated based on the air amount as the target torque equivalent value.

11. The control apparatus for an engine according to claim 5, wherein the first calculation device calculates the pressure ratio equivalent value, using a maximum charging efficiency of the engine as the maximum torque equivalent value, and using a target charging efficiency calculated based on the air amount as the target torque equivalent value.

12. The control apparatus for an engine according to claim 6, wherein the first calculation device calculates the pressure ratio equivalent value, using a maximum charging efficiency of the engine as the maximum torque equivalent value, and using a target charging efficiency calculated based on the air amount as the target torque equivalent value.

* * * * *